(12) United States Patent
Lai et al.

(10) Patent No.: US 7,627,672 B2
(45) Date of Patent: Dec. 1, 2009

(54) NETWORK PACKET STORAGE METHOD AND NETWORK PACKET TRANSMITTING APPARATUS USING THE SAME

(75) Inventors: Yu-Jen Lai, Taipei County (TW); Hsin-Chieh Chiang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 706 days.

(21) Appl. No.: 11/306,565

(22) Filed: Jan. 3, 2006

(65) Prior Publication Data

US 2007/0086428 A1    Apr. 19, 2007

(30) Foreign Application Priority Data

Oct. 19, 2005    (TW)    .............................. 94136517 A

(51) Int. Cl.
*G06F 12/00* (2006.01)
(52) U.S. Cl. ........................ 709/224; 709/229; 370/351; 370/371
(58) Field of Classification Search ................... 709/224
See application file for complete search history.

(56) References Cited

U.S. PATENT DOCUMENTS

| | | | | |
|---|---|---|---|---|
| 6,118,768 A | * | 9/2000 | Bhatia et al. | ................ 370/254 |
| 6,314,501 B1 | * | 11/2001 | Gulick et al. | ................ 711/153 |
| 6,735,210 B1 | * | 5/2004 | Lindeborg et al. | .......... 370/412 |
| 6,892,309 B2 | * | 5/2005 | Richmond et al. | ............. 726/7 |
| 2004/0246980 A1 | * | 12/2004 | Balakrishnan | ............... 370/412 |
| 2005/0243856 A1 | * | 11/2005 | Mishra et al. | ................ 370/447 |
| 2006/0104230 A1 | * | 5/2006 | Gidwani | ..................... 370/328 |
| 2006/0164987 A1 | * | 7/2006 | Ruiz Floriach et al. | ...... 370/235 |

* cited by examiner

*Primary Examiner*—Wing F Chan
*Assistant Examiner*—Andrew Woo
(74) *Attorney, Agent, or Firm*—Jianq Chyun IP Office

(57) ABSTRACT

A network packet storage method and network packet transmitting apparatus using the same is provided. A packet content and a path control information are obtained from a received packet, and a packet storage address of the packet content is determined according to a predetermined storage rule. The packet content is stored in a data block and packet storage addresses and path control information of packets output via the same output port are stored in a control block. The data block is output when its size reaches a predetermined data block size such that a dynamic random access memory receives the data block by using burst mode. Further, the control block is output when its size reaches a predetermined control block size.

8 Claims, 7 Drawing Sheets

| logic row A | VOQ_0 | VOQ_1 | VOQ_2 | VOQ_3 | VOQ_4 | VOQ_5 | VOQ_6 | VOQ_7 | 75a |
| logic row B | VOQ_0 | VOQ_1 | VOQ_2 | VOQ_3 | VOQ_4 | VOQ_5 | VOQ_6 | VOQ_7 | 75b |
| logic row C | VOQ_0 | VOQ_1 | VOQ_2 | VOQ_3 | VOQ_4 | VOQ_5 | VOQ_6 | VOQ_7 | 75c |
| logic row D | VOQ_0 | VOQ_1 | VOQ_2 | VOQ_3 | VOQ_4 | VOQ_5 | VOQ_6 | VOQ_7 | 75d |

FIG. 8

NETWORK PACKET STORAGE METHOD AND NETWORK PACKET TRANSMITTING APPARATUS USING THE SAME

CROSS-REFERENCE TO RELATED APPLICATION

This application claims the priority benefit of Taiwan application serial no. 94136517, filed on Oct. 19, 2005. All disclosure of the Taiwan application is incorporated herein by reference.

BACKGROUND OF THE INVENTION

1. Field of Invention

The present invention relates to a processing method and processing apparatus for network packets. More particularly, the present invention relates to a network packet storage method and network packet transmitting apparatus using the same.

2. Description of Related Art

Nowadays, with the rapid development of the Internet, the network congestion problem is increasingly severe, which significantly brings down the network quality of service. Generally, the existing switches or routers use an embedded or external Static Random Access Memory (SRAM) as the packet buffer area, mainly because the required capacity of the packet buffer area is not necessarily large when the network speed is not rapid or there are not many switches/routers and the so-called Quality of Service (QoS) is not supported. Moreover, the access timing of the SRAM is better than that of the Dynamic Random Access Memory (DRAM). Thus, the SRAM is used widely.

However, if the speed of each port reaches Gigabit or 10 Gigabits, and 16 or more ports are to be supported, and the so-called Jumbo Frame support and QoS need be considered, since more processes are to be performed on the packet data, the time for the packet remaining in the switch becomes longer, which means the amount of the packet data to be stored is very large, and thus a larger memory is required to store the data. At this time, the DRAM is a good option.

However, in terms of the access characteristic of the DRAM, if the Row Address is to be changed each time when the DRAM is accessed, it takes some time to perform Active Bank/Row, pre-charge and the like. Therefore, with respect to this characteristic, there are two common approaches.

In the first approach, a plurality of DRAM controllers are used for controlling a plurality of DRAM modules, and a scheduling controller is used for managing the Overhead Accesses required by each DRAM, such as active bank/row, pre-charge and the like. Except for the DRAMs which are performing these overhead accesses, other DRAMs are assigned to be used by the system. The problem ramified therefrom is that too many DRAM controllers are used, which does not follow the economical and practical principles of implementing the circuit.

The second approach is to use a single DRAM and a single DRAM controller; however, in this approach, the basic overhead access time is still required, and an Arbiter Controller is used to arrange the access of each Bank. During the reading and writing operations of the internal circuit, for the access to the same row, the access bandwidth of an unused bank is wasted, and thus the arbiter controller assigns and arranges the user with a higher priority to access the access space of the bank. However, the approach also causes the written and read packet data to form discrete segments. In order to incorporate and read out the packet data in different segments normally, much additional information is required to record the exact address of data in each segment on the DRAM.

SUMMARY OF THE INVENTION

Accordingly, the present invention is directed to provide a network packet transmitting apparatus, in which only a single DRAM controller is used, and the overhead accesses required by the DRAM are reduced through some specific data arrangements.

The present invention is further directed to provide a network packet storage method, in which the burst mode is used as the data transmitting principle, thereby reducing the additional burdens of overhead accesses required by the DRAM.

The present invention provides a network packet transmitting apparatus, comprising a packet receiving module, an input packet control module, a control information queue unit, a dynamic random access memory and a packet output module. The packet receiving module receives a packet and obtains a packet content and a path control information from the packet. The input packet control module is coupled to the packet receiving module, for storing the aforementioned packet content and determining a packet storage address of the packet content according to a predetermined storage rule, and for outputting a data block accumulated by all the stored packet contents when its size reaches a predetermined data block size. Moreover, the input packet control module is further used for aggregating packet storage addresses and path control information of the packet contents from the same output port into a control block according to the aforementioned path control information, and outputting the control block when its size reaches a predetermined control block size, and providing an output trigger signal. The control information queue unit couples the input packet control module with the packet output module, for storing the aforementioned output trigger signals and sending them one by one. The dynamic random access memory is coupled to the input packet control module, for storing the data block and the control block. The packet output module is coupled to the dynamic random access memory and the input packet control module, for obtaining the corresponding data for outputting from the dynamic random access memory according to the output trigger signal.

In an embodiment of the present invention, the above input packet control module comprises a buffer area management unit and a control unit. Wherein, the buffer area management unit initially obtains a control area storage state indicating the use state of the storage area of the dynamic random access memory for storing the control blocks, then provides an available row address according to the control area storage state when the packet control module needs an available row, and adjusts the control area storage state dynamically according to the available row address provided per se and the data output state of the packet output module. The control unit is coupled to the buffer area management unit and the above control information queue unit, for determining an address of the data block according to one data area storage state of the use state of the storage area of the dynamic random access memory for storing the data block, determining an address of the control block according to the above available row address, aggregating and outputting the data block and the control block, and generating the above output trigger signal when outputting the control block.

In an embodiment of the present invention, the aforementioned control unit comprises a transmitting interface, a data block agent, a control block agent, a link manager, a packet manager, a row allocator and a built-in memory. Wherein, the transmitting interface is coupled to the dynamic random access memory for transmitting data. The data block agent and the control block agent are coupled to the transmitting interface for providing the data block and the control block to the transmitting interface respectively. The link manager is coupled to the data block agent, for obtaining the aforementioned data area storage state through the transmitting interface. The packet manager is coupled to the link manager and the aforementioned packet receiving module, for receiving the above packet content and path control information, and determining the above packet storage address according to the data area storage state. The row allocator is coupled to the buffer area management unit and the packet manager, which has a plurality of logic rows for storing the packet storage addresses and the path control information, and determines the corresponding address of the logic row in the dynamic random access memory according to the available row address. The built-in memory is coupled to the packet manager and the data block agent, for storing the packet content to generate the data block, and providing the data block to the data block agent.

In another aspect, the present invention provides a network packet storage method, in which a packet content and a path control information are obtained from a received packet, and a packet storage address of the packet content is determined according to a predetermined storage rule. Then, the packet content is stored in a data block, and packet storage addresses and path control information of packets output via the same output port are stored in a control block. Finally, the data block is output when its size reaches a predetermined data block size, such that the dynamic random access memory receives the data block in burst mode, and the control block is output when its size reaches a predetermined control block size.

In an embodiment of the present invention, during the above operation of storing packet storage addresses and path control information of packets output via the same output port in the control block, a control area storage state indicating the use state of the storage area of the dynamic random access memory for storing the control block is obtained firstly, and then a plurality of logic rows are provided to store the packet storage addresses and the path control information. Wherein, the corresponding addresses of the logic rows in the dynamic random access memory are determined by the control area storage state.

In an embodiment of the present invention, during the above operation of providing a plurality of logic rows to store the packet storage addresses and the path control information, a plurality of private storage spaces and a common storage space are provided to each logic row firstly, wherein the private storage spaces correspond to a plurality of existing output ports one by one, and the output ports each have a priority storage sequence for arranging the priority of the logic rows. Initially, the logic rows are arranged in a specific original priority, and the priority storage sequence of each output port is completely the same. Then, for each packet, the following steps are performed from the logic row with the highest priority in the priority storage sequence of the output port corresponding to the packet: a. determining whether there is enough space in the private storage space corresponding to the output port via which the packet is output to store the above packet storage address and path control information, and if so, the packet storage address and path control information are stored in the private storage space; b. if there is not enough space in the private storage space, determining whether there is enough space in the common storage space to store the packet storage address and path control information, and if so, the packet storage address and path control information are stored in the common storage space; and c. if there is not enough space in the common storage space, the priority of the logic row with the original highest priority in the priority storage sequence is adjusted to be the lowest, while the priorities of other logic rows are adjusted upwards for one level, and the operations of a~c are repeated.

In an embodiment of the present invention, when the logic rows with the highest priority in the priority storage sequences of all of the output ports are no longer the logic rows with the highest original priority, the data of the logic row with the highest original priority is transferred to the dynamic random access memory, and the original priority of the logic row is adjusted to be the lowest, while the priorities of other logic rows are adjusted upwards for one level.

In an embodiment of the present invention, when the logic row with the highest priority in the priority storage sequence of any of the output ports is the same as the logic row with the lowest priority in the priority storage sequence of another output port, the priority storage sequences corresponding to some of the output ports are adjusted firstly such that the priority of the logic row with the highest priority is adjusted to be the lowest, while the priorities of other logic rows are adjusted upwards for one level. Wherein, the adjusted output ports are those in which the logic row with the highest original priority is used as the logic row with the highest priority in their corresponding priority storage sequences. Moreover, the data of the logic row with the highest original priority is transferred to the dynamic random access memory, and the original priority of the logic row is adjusted to be the lowest, while the original priorities of other logic rows are adjusted upwards for one level.

To sum up, in the present invention, the internal actions of the network packet transmitting apparatus are divided into a control path and a data path, various information is stored in the internal embedded memory in the form of blocks, and is written into the DRAM in burst mode when a certain amount of data is collected, and thus the access efficiency can be improved. Furthermore, since the packets written in burst mode are arranged sequentially in the output sequence of the output ports, they can be read out and sent to the output ports in burst mode without disorder.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8 is a schematic view of row assignment of a row allocator according to an embodiment of the present invention.

DESCRIPTION OF EMBODIMENTS

Figure 1:
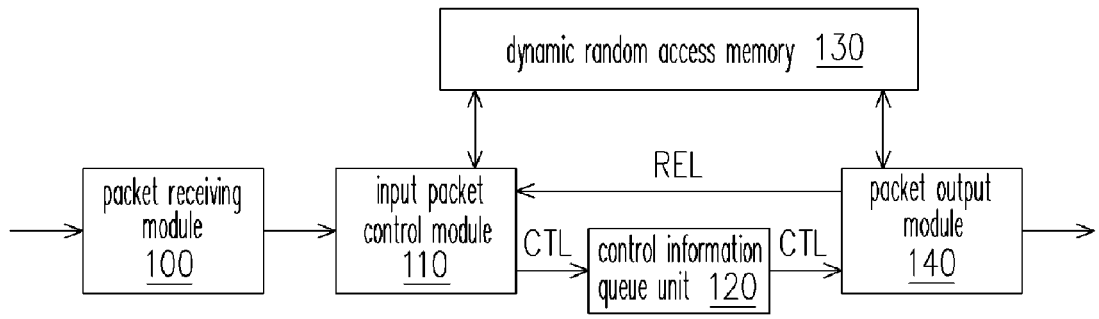
FIG. 1 is a circuitry block diagram of a network packet transmitting apparatus according to an embodiment of the present invention.
Figure 5:
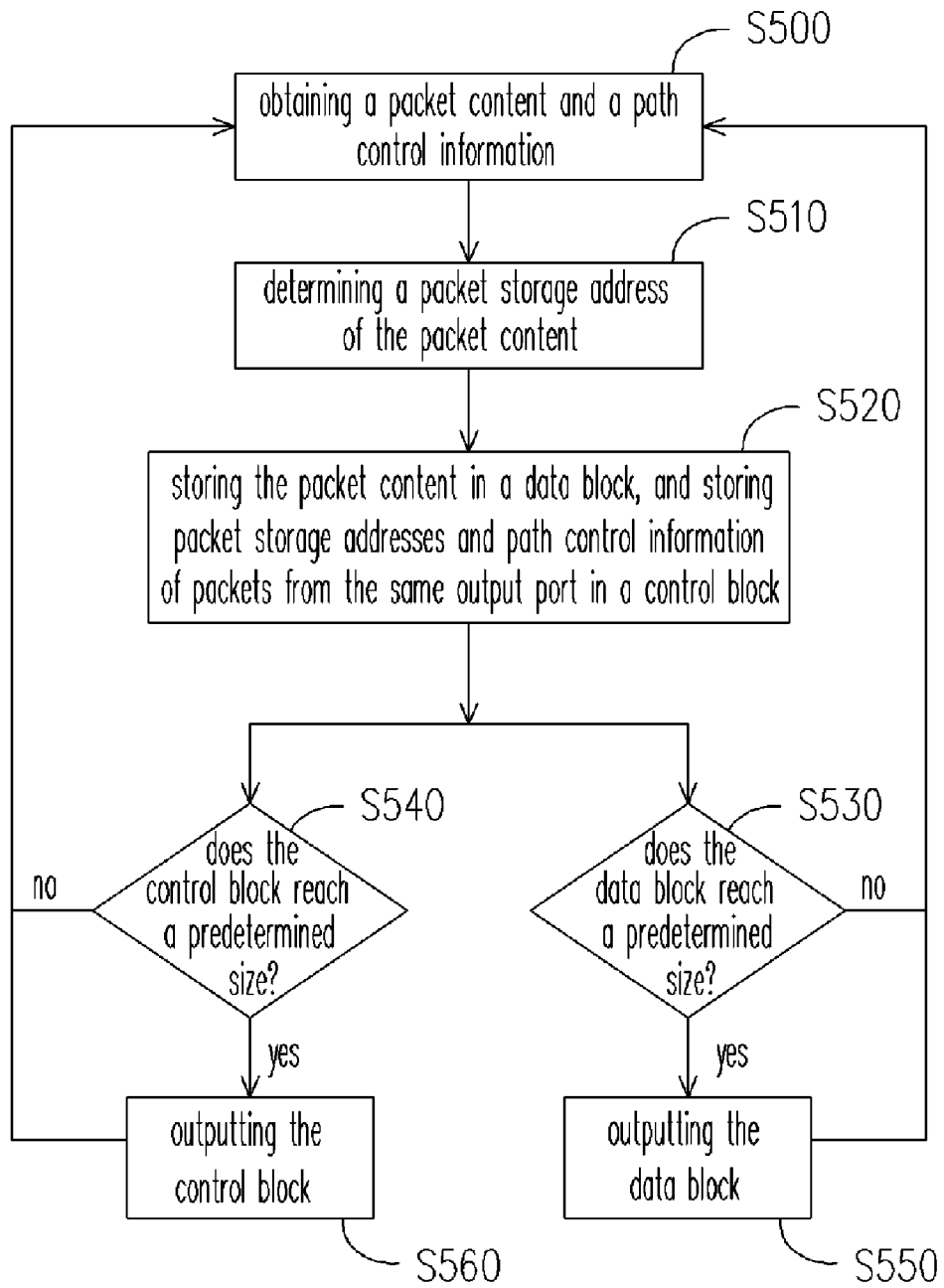
FIG. 5 is a flow chart of a packet storage method according to an embodiment of the present invention.

Referring to FIG. 1, it is a circuitry block diagram of a network packet transmitting apparatus according to an embodiment of the present invention. For the detailed illustration for the operations of the circuit elements, also refer to FIG. 5, a flow chart of a packet storage method according to an embodiment of the present invention. In the present embodiment, the network packet transmitting apparatus 10 comprises a packet receiving module 100, an input packet control module 110, a control information queue unit 120, a dynamic random access memory (DRAM) 130 and a packet output module 140. Wherein, after receiving a packet, the packet receiving module 100 retrieves the Packet Header and sends it to the search engine, so as to find out the destination output port of the packet, and then sends it to the input packet control module 110 the packet content of the packet and the path control information for determining which Virtual Output Queue (VOQ) the packet will reach (step S500).

The input packet control module 110 stores the received packet content and path control information, and determines the future packet storage address of such a packet content in the DRAM 130 according to a predetermined storage rule (step S510). All the stored packet contents are aggregated into a data block, and path control information and packet storage addresses from the same output port are aggregated into a control block (step S520). All of the data block and the control block are to be transferred to the DRAM 130 when their sizes reach a predetermined block size (e.g. the predetermined data block size and the predetermined control block size may be 2 K Bytes) (step S530~S560). When sending out the control block, the input packet control module 110 also sends an output trigger signal CTL to the control information queue unit 120, which buffers this output trigger signal CTL and transfers the received output trigger signals CTL to the packet output module 140 one by one.

Generally, the output trigger signal comprises the storage address of the control block in the DRAM 130. Therefore, after receiving the output trigger signal CTL, the packet output module 140 may obtain the corresponding control block from the DRAM 130 according to the storage address, and further obtain the corresponding data block and the related packet content for outputting according to the information in the control block.

Figure 2:
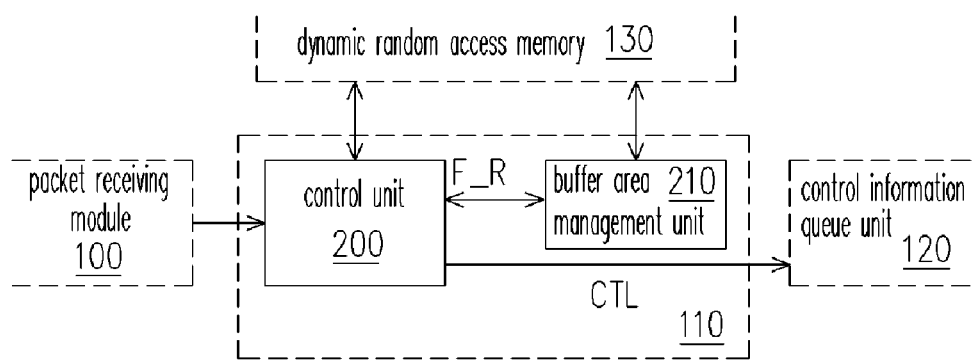
FIG. 2 is a circuitry block diagram of an input packet control module according to an embodiment of the present invention.

Further, referring to FIG. 2, it depicts a circuitry block diagram of an input packet control module according to an embodiment of the present invention. Also referring to FIG. 6, it is a flow chart of an embodiment of storing packet storage addresses and path control information in step S520 of FIG. 5, which is a flow chart of a packet storage method according to an embodiment of the present invention. In the present embodiment, the input packet control module 110 comprises a control unit 200 and a buffer area management unit 210. The buffer area management unit 210 obtains a control area stor-age state from the DRAM 130 initially, wherein the control area storage state indicates the use state of the storage area of the DRAM 130 for storing the control block. Once the control unit 200 needs an available row, an available row address F_R is provided according to the control area storage state (step S600). Furthermore, the buffer area management unit 210 adjusts the control area storage state dynamically according to the available row address F_R provided previously and the data output state REL of the packet output module 140 (see FIG. 1). The control unit 200 determines an storage address of the data block according to the data area storage state obtained from the DRAM 130, determines an storage address of the control block according to the above available row address, aggregates and outputs the data block and the control block as described above, and generates the above output trigger signal CTL when outputting the control block. Wherein, the data area storage state is used for indicating the use state of the storage area of the DRAM 130 for storing the data block.

In other words, for the packet content, the control unit 200 stores the incoming packet content, then determines which row of the DRAM 130 the packet data should be stored according to a rule; i.e., the address in which the packet content to be stored in the DRAM 130 is pre-arranged, and a data block is continuously written into the DRAM 130 after the data amount of the data block has been accumulated, thereby achieving the effect of burst writing. On the other hand, for the path control information, the control unit 200 performs the assignation according to the VOQ that each packet will reach, and thus for the corresponding VOQ of each output port, the assigned path control information and the storage addresses pre-arranged when processing the data block previously are collected together as the control block of the VOQ. After a complete control block has been accumulated, this control block is also written into the storage address of the VOQ. Therefore, the control unit 200 is also used for collecting the data of the data block and the control block, and once their sizes reach a predetermined size, they will be written into the DRAM 130 in burst mode.

Figure 3:
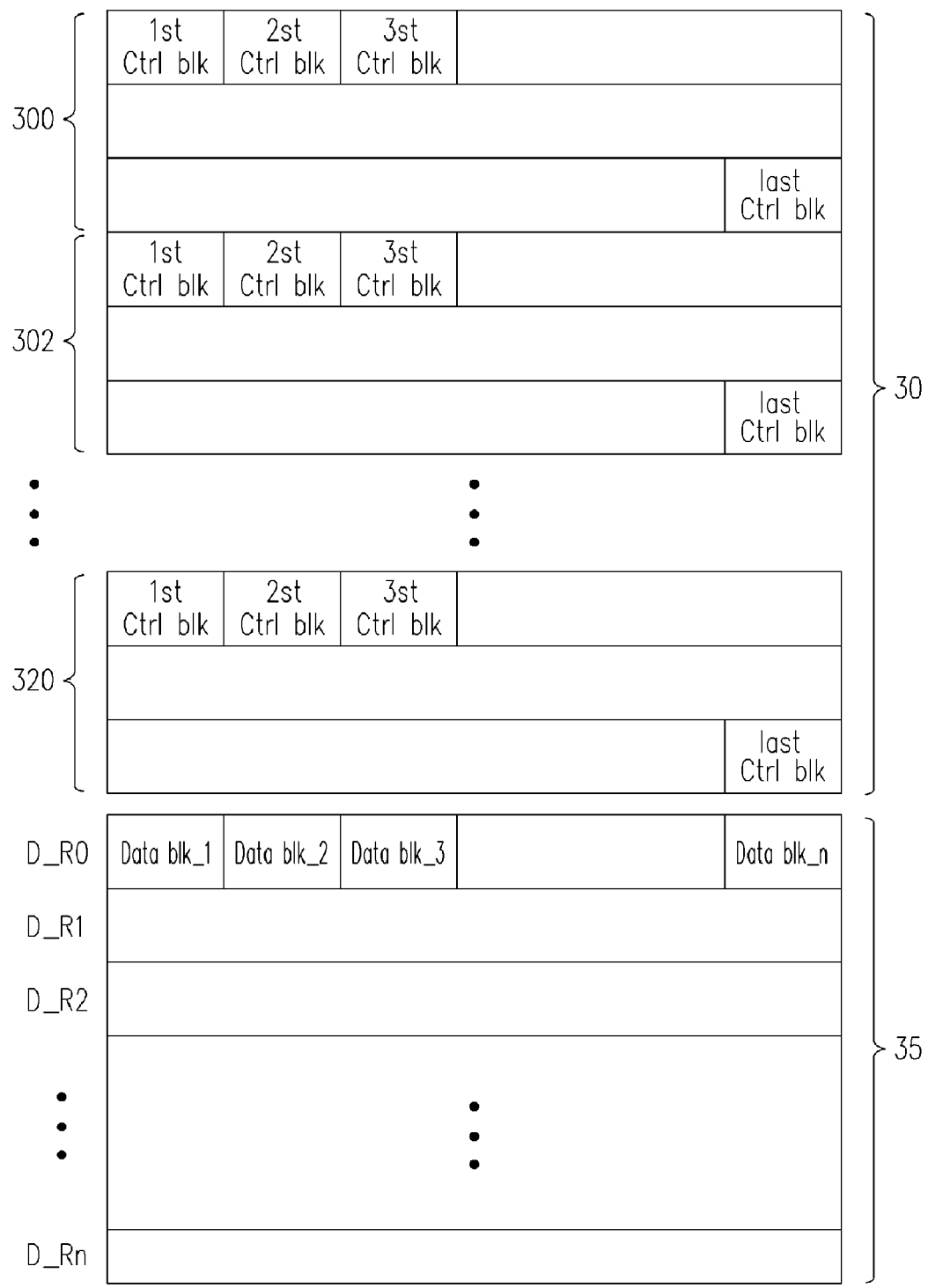
FIG. 3 shows an embodiment of the data storage architecture in the DRAM 130.

An embodiment of the data storage architecture in the DRAM 130 is described with reference to FIG. 3. In the present embodiment, the DRAM 130 is divided into two parts, wherein an area 30 is used for storing control blocks, and an area 35 is used for storing data blocks. When the control unit 200 processes a data block, it will request the DRAM 130 to provide an available row address, such that the data block may be stored into the DRAM 130 successfully. In the row data structure on the DRAM 130, a plurality of data blocks, i.e., Data_blk_1~Data_blk_n, will be written in a row space. The control blocks are generated according to the VOQ corresponding to each output port. Therefore, the area 30 will be equally assigned to the VOQs 300~320 corresponding to a plurality of output ports. Each time the control unit 200 generates the control blocks of one VOQ, the control unit 200 will give the addresses of the memory in sequence for storing the control blocks generated by the VOQ. In other words, the storage addresses of the control blocks of each VOQ in the DRAM are successive. That is, in the stage of initializing the system, the DRAM 130 will inform the control unit 200 and the buffer area management unit 210 of the row size and storage field size, such that the control unit 200 can manage and assign the control block storage addresses corresponding to the VOQ.

Figure 4:
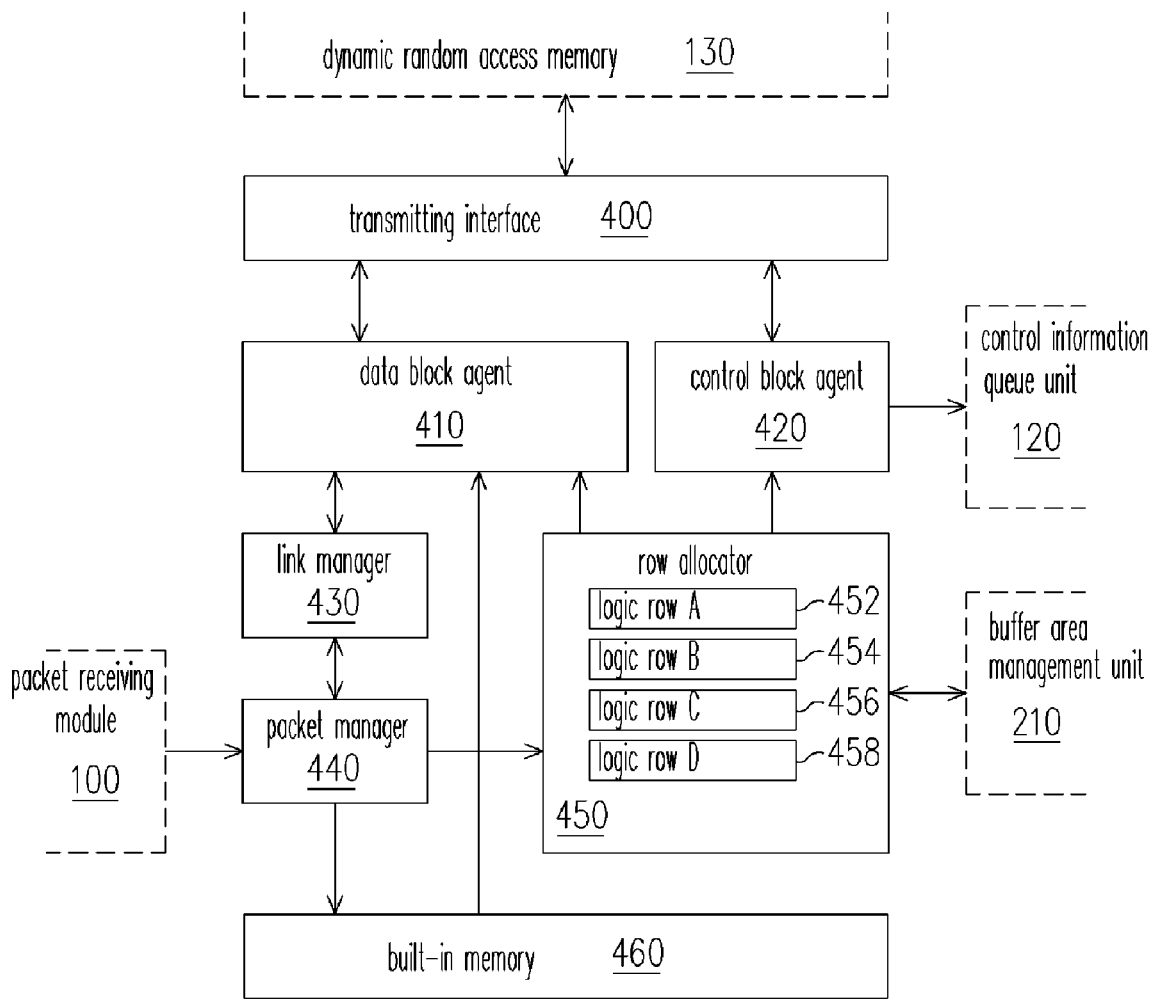
FIG. 4 is an internal circuitry block diagram of a control unit according to an embodiment of the present invention.
Figure 6:
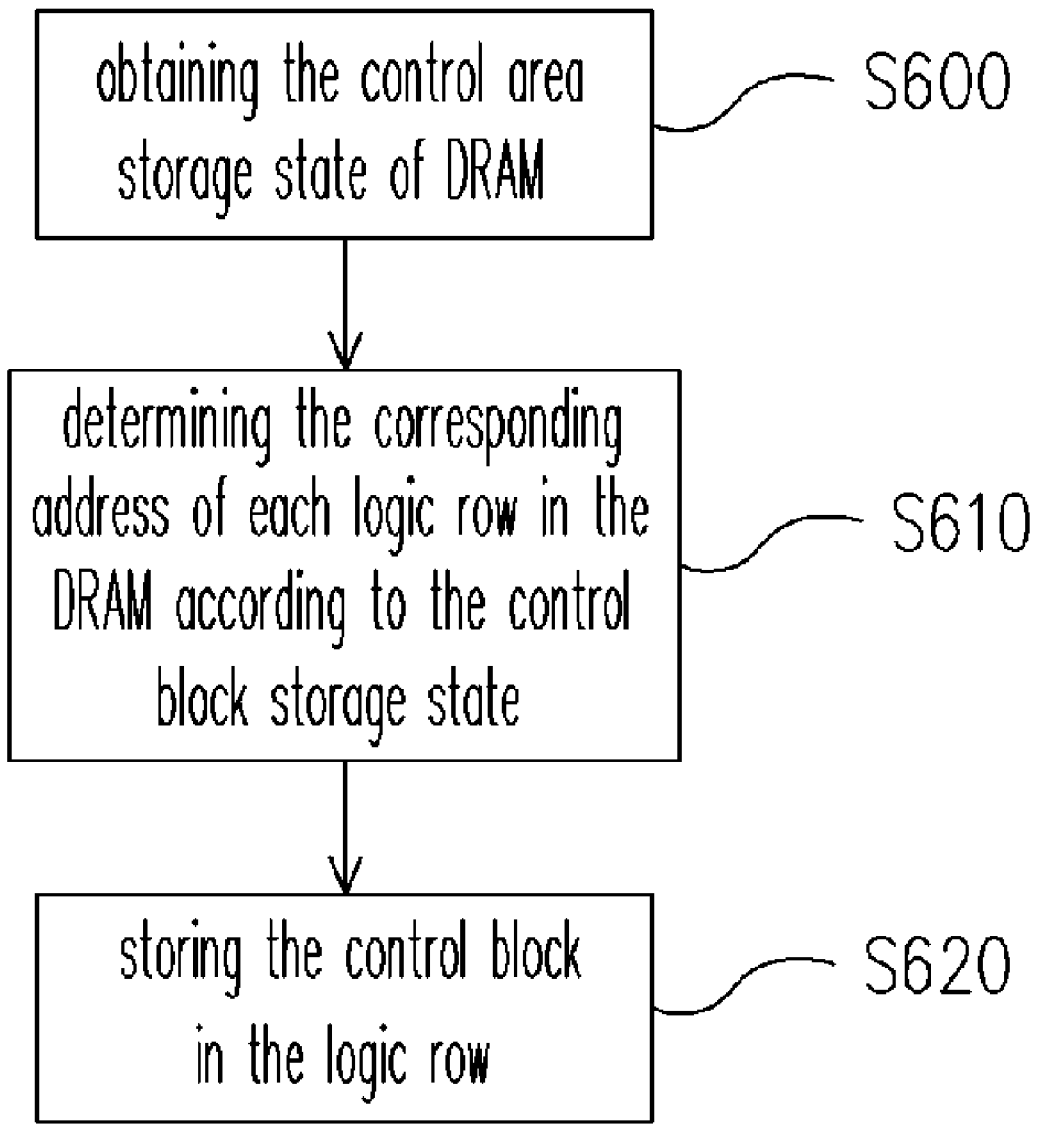
FIG. 6 is a flow chart of an embodiment of storing packet storage addresses and path control information in the step S520 of FIG. 5.

Now referring to FIGS. 4 and 6. FIG. 4 is an internal circuitry block diagram of the control unit according to an embodiment of the present invention. In the present embodiment, the control unit 40 comprises a transmitting interface 400, a data block agent 410, a control block agent 420, a link manager 430, a packet manager 440, a row allocator 450 and a built-in memory 460. Wherein, the transmitting interface 400 is coupled to the DRAM 130 for transmitting data. The data block agent 410 and the control block agent 420 are coupled to the transmitting interface 400 for providing the data block and the control block to the transmitting interface 400 respectively. The link manager 430 is coupled to the data block agent 410, for obtaining the data area storage state through the transmitting interface 400. The packet manager 440 is coupled to the link manager 430 and the packet receiving module 100, for receiving a packet content and a path control information, and determining a packet storage address according to the data area storage state. The row allocator 450 is coupled to the buffer area management unit 210 and the packet manager 440, which has a plurality of logic rows 452~458, and determines the corresponding addresses of the logic rows 452~458 in the DRAM 130 according to the available row addresses obtained from the buffer area management unit 210 (step S610), and stores the packet storage addresses and the path control information in the logic rows 452~458 (step S620). Moreover, the row allocator 450 also provides the packet storage address to the data block agent 410 to be used in storing the data block. The built-in memory 460 is coupled to the packet manager 440 and the data block agent 410, for storing the packet content to generate a data block, and providing the data block to the data block agent 410.

Figure 7:
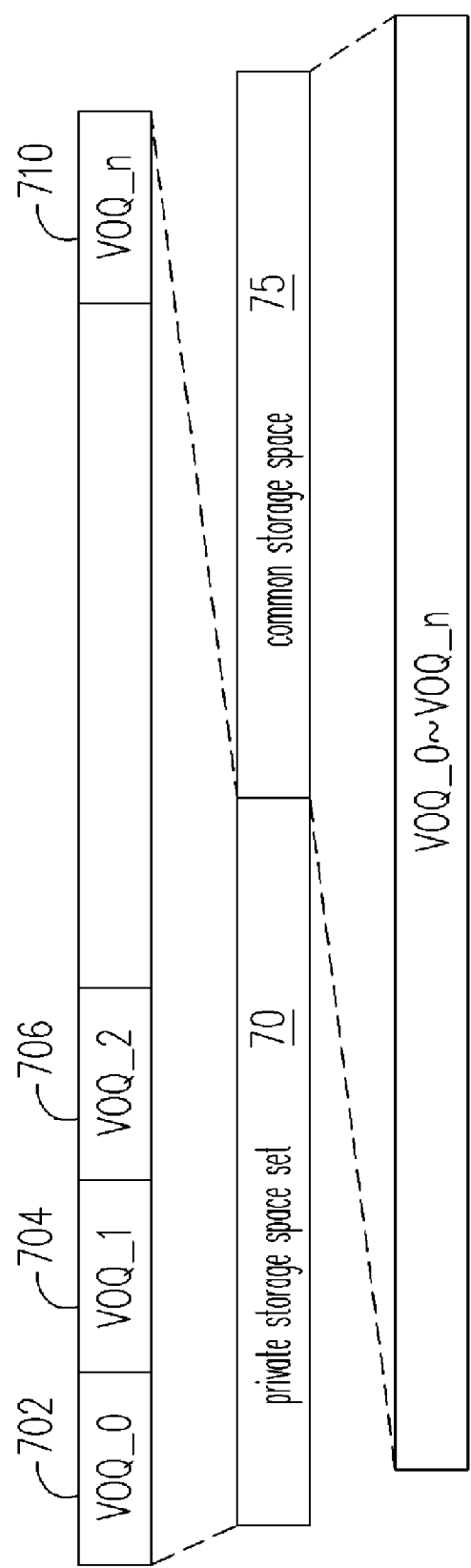
FIG. 7 shows the storage content in a logic row according to an embodiment of the present invention.

The processing method of a logic row is further described below. It is assumed that there are n output ports in this case. Referring to FIG. 7, it shows the storage content of a logic row according to an embodiment of the present invention. Wherein, a logic row is divided into a private storage space set 70 and a common storage space 75. The private storage space set 70 in the present embodiment is divided into a plurality of private storage spaces 702~710 for corresponding to the virtual output queues VOQ_0~VOQ_n of n output ports one to one. Therefore, each VOQ has a specific memory space for saving purpose (only the storage space is limited, not the storage address). In brief, the assigned space of each VOQ in the private storage spaces 702~710 allows it to have an individual fixed amount of data for accessing. If the private storage space 702~710 of a certain VOQ has been filled up, the incoming control related data which belongs to this VOQ will be allowed to use the common storage space 75. Therefore, the common storage space 75 may be shared by VOQ_0~n, provided that the common storage space 75 can be used only when the individual private storage space 702~710 of the VOQ has been filled up.

Referring to FIG. 8, it is a schematic view of row assignment of a row allocator according to an embodiment of the present invention. In this embodiment, it is assumed that the row allocator comprises four logic rows, and after initialization, the order of priority is such that the priority of the upmost logic row (Logic Row A) is highest, then Logic Row B, Logic Row C the Logic Row D in sequence. This order of priority is later referred to as an original priority. Further, after initialization, for each output port, in the priority storage sequence employed when a logic row is selected to store its VOQ, the priority arranged for the logic rows is also equivalent to the original priority.

When the packet related information enters the row allocator 450, it is transmitted to a logic row with the highest priority (assumed to be Logic Row A at this time). Wherein, after initialization, the row allocator 450 has already known the available row storage address assigned to each logic row through the buffer area management unit 210. Now assuming that the packet related information comprises head link address, cell count (assumed to be 10 units) and the information about that the virtual output queue of VOQ_2 is to be transferred to Logic Row A, Logic Row A will check whether there is a space of 10 units in the private storage space of the virtual output queue VOQ_2 in Logic Row A for accessing purpose, through the information such as the information size, the virtual output queue being VOQ_2 and the like. If there is still enough space in the private storage space for storing purpose, the data of 10 units are arranged and placed sequentially in Logic Row A according to successive addresses, with 4 units as a group at a time, and the offset of the place address of the first unit in Logic Row A is recorded.

On the contrary, if the private storage space of the virtual output queue VOQ_2 has been maxed out, and the common storage space can still store the packet related information sent this time, the 10-unit content of the virtual output queue VOQ_2 is stored in the common storage space. Thus, the row offset is simply pre-arranged in which the data of these units is to be placed in the DRAM 130, but the operations of moving and transmitting the packet data and storing it in the DRAM 130 are not really finished.

The row allocator 450 sends the related control information to the control block agent 420, such as the row offsets generated by the data with 4 units as a group, the virtual output queue being VOQ_2 and the like, thereby providing the control block agent 420 the control information to generate a control block. As to the data block, the row allocator 450 sends the unit number of the packet to the data block agent 410, informs the address in which the packet has been arranged to be stored in the DRAM 130, and writes a data block in the DRAM 130 in burst mode after a certain amount of the data block has been accumulated. Furthermore, since the row allocator manages the corresponding private storage space of each VOQ in the logic row, there will be 8 private counters for recording the limited space which has been used by each VOQ, and a common counter for recording the share space of the common storage space which has been used.

During the above operation, if after the packet information has entered and it is checked that the private storage space of the virtual output queue VOQ_2 has been maxed out, and there is only 8-unit storage space remained in the common storage space, which is not enough to store 10 units, the row allocator 450 transmits this packet information and the packet information which enters later and is to be filled in the virtual output queue VOQ_2 to Logic Row B with the second highest priority, and the above operations are preformed by the Logic Row B. In other words, when both the private storage space and the common storage space have not enough storage space, it is necessary that the priority of the logic row with the highest original priority (here is Logic Row A) in the priority storage sequence of the storing port (also corresponding to a VOQ) is adjusted to be the lowest, and the priorities of other logic rows (Logic Row B~D) are adjusted upwards for one level. Thus, even if there are packets of the virtual output queue VOQ_2 entering later, they can not be written into Logic Row A, but can be written from Logic Row B. In such a manner, the packet output order of the same output port will not be broken.

In this operation mode, there might be several situations. One situation is that, when the logic rows with the highest priority in the priority storage sequences of all of the output ports are no longer the logic rows with the highest original priority; that is, in the present embodiment, the priority of Logic Row A in the priority storage sequence of each output port has been adjusted downwards, and the priorities of other logic rows Logic Row B~D have been adjusted upwards, the data of Logic Row A (still with the highest original priority at this point) may be delivered to the DRAM 130, since no data will be written into Logic Row A, and then the original priority of Logic Row A is adjusted to be the lowest, while the original priorities of other logic rows Logic Row B~D are adjusted upwards for one level.

Another situation is that, the packets from the same output port (or VOQ) enter continuously, and there is few or no packet from other output ports. For example, it is possible that the packet information of the virtual output queue VOQ_2 has been written into Logic Row D, but the packet information of VOQs of some output ports is only written into the Logic Row A. In this case, in order to facilitate the subsequent operations, it is necessary for the control information in Logic Row A to be delivered to the DRAM 130, to ensure the control information which enters subsequently will not be lost. At the same time, the priority storage sequence of each output port should be adjusted as described above, and the original priority of each logic row should be adjusted as well.

To sum up, through the present invention, the data is written into the DRAM in burst manner, and thus the access efficiency can be increased. Moreover, since the packets written in burst manner are arranged sequentially according to the output order of the output ports, they can be read out and sent to the output ports in burst mode without disorder.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A network packet transmitting apparatus, comprising:
    a packet receiving module for receiving a packet and obtaining a packet content and a path control information from the packet;
    an input packet control module coupled to the packet receiving module, for storing the packet content and determining a packet storage address of the packet content according to a predetermined storage rule, and for outputting a data block accumulated by all the stored packet contents when a size of the data block reaches a predetermined data block size, and further for aggregating the packet storage addresses and the path control information of the packet contents from the same output port into a control block according to the path control information, and outputting the control block when a size of the control block reaches a predetermined control block size, and providing an output trigger signal;
    a control information queue unit for coupling the input packet control module with the packet output module, and storing the output trigger signals and sending them one by one;
    a dynamic random access memory coupled to the input packet control module, for storing the data block and the control block in a dynamic random access memory; and
    a packet output module coupled to the dynamic random access memory and the input packet control module, for obtaining the corresponding data for outputting from the dynamic random access memory according to the output trigger signal.

2. The network packet transmitting apparatus as claimed in claim 1, wherein the input packet control module comprises:
    a buffer area management unit, for initially obtaining a control area storage state which indicates the use state of the storage area of the dynamic random access memory for storing the control block, then providing an available row address according to the control area storage state when the packet control module needs an available row, and adjusting the control area storage state dynamically according to the available row address and the data output state of the packet output module; and
    a control unit coupled to the buffer area management unit and the control information queue unit, for determining an address of the data block according to a data area storage state indicating the use state of the storage area of the dynamic random access memory for storing the data block, determining an address of the control block according to the available row address, aggregating and outputting the data block and the control block, and outputting the output trigger signal when outputting the control block.

3. The network packet transmitting apparatus as claimed in claim 2, wherein the control unit comprises:
    a transmitting interface coupled to the dynamic random access memory, for transmitting data;
    a data block agent coupled to the transmitting interface, for providing the data block to the transmitting interface;
    a control block agent coupled to the transmitting interface, for providing the control block to the transmitting interface;
    a link manager coupled to the data block agent, for obtaining the data area storage state through the transmitting interface;
    a packet manager coupled to the link manager and the packet receiving module, for receiving the packet content and the path control information and determining the packet storage address according to the data area storage state;
    a row allocator coupled to the buffer area management unit and the packet manager, the packet manager having a plurality of logic rows for storing the packet storage address and the path control information, and determining the corresponding addresses of the logic rows in the dynamic random access memory according to the available row address; and
    a built-in memory coupled to the packet manager and the data block agent, for storing the packet content to generate the data block, and providing the data block to the data block agent.

4. A network packet storage method, comprising:
    obtaining a packet content and a path control information from a received packet;
    determining a packet storage address of the packet content;
    storing the packet content in a data block;
    storing packet storage addresses and path control information of packets output via the same output port in a control block;
    outputting the data block when a size of the data block reaches a predetermined data block size, such that a dynamic random access memory receives the data block in burst mode;
    aggregating the packet storage addresses and the path control information of the packet contents from the same output port into a control block according to the path control information;
    outputting the control block when a size the control block reaches a predetermined control block size;
    providing an output trigger signal;
    storing the output trigger signals and sending them one by one;
    storing the data block and the control block in a dynamic random access memory; and obtaining the corresponding data for outputting from the dynamic random access memory according to the output trigger signal.

5. The network packet storage method as claimed in claim 4, wherein the step of storing packet storage addresses and path control information of packets output via the same output port in a control block comprises:
   obtaining a control area storage state indicating the use state of the storage area of the dynamic random access memory for storing the control block; and
   providing a plurality of logic rows for storing the packet storage addresses and the path control information, wherein the corresponding addresses of the logic rows in the dynamic random access memory are determined by the control area storage state.

6. The network packet storage method as claimed in claim 5, wherein the step of providing a plurality of logic rows for storing the packet storage addresses and the path control information comprises:
   providing a plurality of private storage spaces and a common storage space to each of the logic rows, wherein the private storage spaces correspond to a plurality of existing output ports one by one, the output ports each having a priority storage sequence for re-arranging a priority of the logic rows arranged according to an original priority initially, and the respective priority storage sequences of the output ports being completely the same initially; and
   for each packet, the following steps are performed from the logic row with the highest priority in the priority storage sequence of the output port corresponding to the packet:
   a. determining whether there is enough space in the private storage space corresponding to the output port via which the packet is output to store the packet storage address and the path control information, and if so, storing the packet storage address and the path control information in the private storage space;
   b. if there is not enough space in the private storage space, determining whether there is enough space in the common storage space to store the packet storage address and the path control information, and if so, storing the packet storage address and the path control information in the common storage space; and
   c. if there is not enough space in the common storage space, adjusting the priority of the logic row with the highest original priority in the priority storage sequence to be the lowest, while adjusting the priorities of other logic rows upwards for one level, and repeating the operations of a~c.

7. The network packet storage method as claimed in claim 6, wherein when the logic rows with the highest priority in the priority storage sequences of all of the output ports are no longer the logic rows with the highest original priority, the data of the logic row with the highest original priority is transferred to the dynamic random access memory, and the original priority of the logic row is adjusted to be the lowest, while the original priorities of other logic rows are adjusted upwards for one level.

8. The network packet storage method as claimed in claim 6, wherein if the logic row with the highest priority in the priority storage sequence of any of the output ports is the same as the logic row with the lowest priority in the priority storage sequence of another output port, then:
   the priority storage sequence corresponding to an output port is adjusted such that the priority of the logic row with the highest priority is adjusted to be the lowest, while the priorities of other logic rows are adjusted upwards for one level, wherein the adjusted output port is the one the logic row with the highest original priority is used as the logic row with the highest priority in the corresponding priority storage sequence;
   the data of the logic row with the highest original priority is transferred to the dynamic random access memory, and the original priority of the logic row is adjusted to be the lowest; and
   the original priorities of other logic rows are adjusted upwards for one level.

* * * * *